United States Patent

[11] 3,584,239

[72] Inventor Alton O. Christenson
Houston, Tex.
[21] Appl. No. 859,292
[22] Filed Sept. 19, 1969
[45] Patented June 8, 1971
[73] Assignee Shell Oil Company
New York NY,
Continuation-in-part of application Ser. No. 787,067, Dec. 26, 1968, now Patent No. 3,502,908, which is a continuation-in-part of application Ser. No. 761,450, Sept. 23, 1968.

[54] CLOCK DRIVER OUTPUT STAGE FOR CAPACITIVE LOAD
5 Claims, 4 Drawing Figs.

[52] U.S. Cl. .......... 307/270, 307/238, 307/243, 307/246, 307/259, 307/317, 328/121
[51] Int. Cl. .......... H03k 3/26
[50] Field of Search .......... 307/205, 214, 238, 243, 246, 251, 259, 270, 279, 304, 317; 328/121

[56] References Cited
UNITED STATES PATENTS
3,025,411 3/1962 Rumble .......... 307/270X
OTHER REFERENCES
An article titled " Multiphase Clocking Achieves 100- N sec. MDS Memory" written by Boysel & Murphy in the June 10, 1968 edition of E.D.N., pp. 50,51,52, & 54. A copy is located in 307/251.
An article titled " ABC' s of Transistors" in the Dec. 1968 edition of Radio Electronics, p.44.

*Primary Examiner*—Stanley T. Krawczewicz
*Attorneys*—T. E. Bieber and J. H. McCarthy

ABSTRACT: A fast acting ratioless bipolar circuit and the application thereof in a clock driver circuit for insulated gate field effect transistor is disclosed. The energy handling capability of the circuit when operated into a capacitive load is discussed. Several embodiments of the circuit are disclosed and various modifications thereof are discussed.

INVENTOR.
ALTON O. CHRISTENSEN
BY
Mellin, Moore & Weissenberger
ATTORNEYS

CLOCK DRIVER OUTPUT STAGE FOR CAPACITIVE LOAD

CROSS-REFERENCE TO RELATED APPLICATIONS

This application is a continuation-in-part of applicant's copending application Ser. No. 787,067 filed Dec. 26, 1968, now Pat. No. 3,502,908 and titled Transistor Inverter Circuit which is itself a continuation-in-part of application Ser. No. 761,450, filed Sept. 23, 1968 and titled "Transistor Inverter Circuit."

BACKGROUND OF THE INVENTION

The parent applications describe insulated gate field effect transistors (IGFETs) and include a detailed description of a particular type of IGFET known as metal oxide silicon field effect transistors (MOSFETs). They also describe circuits utilizing IGFETs and suggest arrays of IGFETs which have the advantage, among others, of being capable of operating without a power supply other than a clock input or inputs the circuit or array. Such circuits and/or arrays are therefore highly desirable since they can be made physically smaller and less expensively than transistor circuits and/or arrays of the prior art.

In order to operate the circuits and/or arrays of the parent applications, it is necessary that the source of clock pulses be capable of supplying pulses of sufficient energy to charge the inherent capacitance of the IGFET circuits and/or arrays described therein. As disclosed in the parent applications simple circuits as described therein may have an input capacitance of the order of several tenths of a picofarad. An array of such circuits may, of course, have an input capacitance of tens to hundreds of picofarads. Thus, clock pulses of substantial energy compared to the energy level at which an IGFET normally operates are required to charge such input capacitance of an array of IGFETs even at the relatively low operating voltages of such arrays.

Thus, it is an object of this invention to provide a source of clock pulses for an array of IGFETs capable of providing high energy pulses.

It is a further object of this invention to provide a circuit for the output stages of a source of clock pulses which requires no power supply other than clock pulses when operating into a capacitive load.

It is yet another object of this invention to provide a circuit for an output stage of a source of clock pulses for operation into a capacitive load in which the duration of the clock pulses may be increased by merely changing the phase relationship of the inputs to such output stage.

BRIEF DESCRIPTION OF THE DRAWING

These and other objects and features of this invention will be more fully understood from the following detailed description when read in conjunction with the drawing wherein.

DESCRIPTION OF PREFERRED EMBODIMENTS

Figure 1:
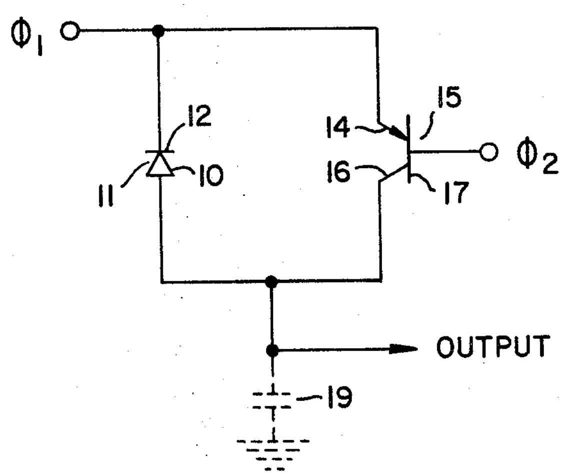
FIG. 1 is a schematic representation of a circuit according to one embodiment of this invention.

Referring to FIG. 1, in the circuit embodying this invention depicted therein, a conventional bipolar transistor diode 11 and a conventional bipolar transistor triode 15 are utilized. The collector or output electrode 12 of the diode 11 is electrically connected directly to the emitter or input electrode 14 of the triode 15 and to first clock input $\phi_1$. The emitter or input electrode 10 of the diode 11 is electrically connected directly to the output or collector electrode 16 of the triode 15. The base or control electrode 17 of the triode 15 is connected to second clock input $\phi_2$. The output of the circuit is taken from the directly connected input electrode 10 of diode 11 and output electrode 16 of triode 15.

As pointed out hereinabove, the circuit in accordance with this invention is intended for use with a capacitive load such as is presented by an array of insulated gate field effect transistors. The capacitance of such a load is indicated in FIG. 1 by the capacitance 19 shown in dotted lines.

Figure 2:
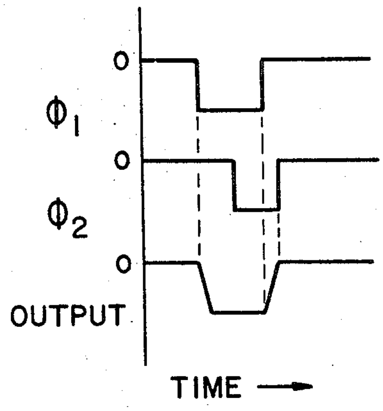
FIG. 2 is a timing diagram of one mode of operation of a circuit embodying this invention showing the phase relationship between the input pulses and the output pulse thereof.

The operation of the circuit shown in FIG. 1 may be more fully understood by referring to the timing diagram of FIG. 2. As shown in FIG. 2 a first clock pulse, which is negative according to this embodiment of the invention, is applied to input $\phi_1$ and thus appears at both the output electrode 12 of the diode 11 and the input electrode 14 of the triode 15. Since the pulse is negative, the diode 11 will conduct and the pulse will appear at the output of the circuit as indicated in FIG. 2. The triode 15, will not conduct in response to the first clock pulse applied to input $\phi_1$ because it is a bipolar device and is connected in the circuit in such a way that the clock pulse at input $\phi_1$ is of the opposite polarity from that required for conduction of triode 15. Thus, even though a second negative clock pulse is applied to the base 17 of triode 15 through input $\phi_2$ as shown in FIG. 2, the triode 15 will not conduct as long as the first clock pulse persists at input $\phi_1$. According to this invention, the clock pulse at input $\phi_1$ must be of sufficient energy to charge the capacitance 19 of the load to the full output potential required since no other power supply is used.

When the clock pulse at input $\phi_1$ has charged the capacitance 19 of the load to the full output potential the diode 11 will, of course, cease to conduct because the voltage appearing at both the input and the output thereof will be the same. When the clock pulse at input $\phi_1$ ceases and input $\phi_1$ returns to ground potential as shown in FIG. 2 a voltage of reverse polarity will appear across diode 11 but since it is a bipolar device of the opposite polarity it will not conduct and the charge on capacitance 19 will remain but for the action of triode 15.

The polarity of the voltage which appears across bipolar triode 15 upon cessation of the clock pulse at input $\phi_1$ will be appropriate for conduction thereof. Since, the second clock pulse applied at input $\phi_2$ is present on the base 17 of triode 15 it will begin to conduct immediately upon cessation of the clock pulse at input $\phi_1$, thus discharging the capacitance 19 of the load to the grounded $\phi_1$ input. As shown in FIG. 2, there will be a certain RC (resistance-capacitance) time constant associated with the discharge of the capacitance 19 through the on-resistance of the triode 15. For this reason at least a portion of the clock pulse at input $\phi_2$ must occur after the cessation of the clock pulse at $\phi_1$ in order to provide time for the discharge of the capacitance 19 through the triode 15.

As pointed out above, the value of the capacitance 19 of the load may vary between tens of picofarads and several hundred picofarads depending on the nature of the IGFET array involved. The on-resistance of the triode 15 will be only a few ohms. Similarly, the on-resistance of the diode 10 will be only a few ohms allowing the capacitance 19 to be charged very rapidly, although it will be understood that the rise and fall times of the pulses shown in FIG. 2 have been exaggerated for purposes of explanation and in an actual device the pulses may have slightly different shapes than those depicted.

Thus, the RC time constants for the charging and discharging of capacitance 19 will be quite short as compared to a similar circuit utilizing IGFETs which typically have on-resistances varying from several hundred to several thousand ohms. In addition, and for the same reason, the circuit of this invention is capable of handling pulses of much larger energy than could be handled by a similar circuit utilizing IGFETs. It will be understood that any type of bipolar devices equivalent to diode 10 and triode 15 would be operative in a circuit in accordance with this invention. For example, electron discharge tubes could be used by reversing the polarity of the clock pulse at $\phi_2$. However, although electron discharge devices are capable of handling the high energy clock pulses according to this invention, the low voltages involved would impose certain limitations on their characteristics and they have the disadvantage of requiring an additional power supply for the cathode heaters thereof. Thus, bipolar devices of the solid state type are preferred.

It will be understood that the circuit of this invention does not require that there by any particular ratio between the on-resistance of the bipolar devices, as was required in prior art clock circuits utilizing bipolar devices. Furthermore it will be seen that in a circuit according to this invention the bipolar devices never conduct simultaneously. Thus, they are only subjected to the heating effects of current flow for short periods as absolutely necessary. For this reason circuits according to this invention can handle pulse of higher energy than would be possible with circuits according to the prior art.

It will be understood, however, that circuits in accordance with this invention will not operate as described with a resistance load such as is presented by arrays of bipolar devices, unless the pulse frequencies are very high indeed. Even where such pulse frequencies are high enough to enable operation as described, the resistance of the load will tend to reduce the energy handling capability of the circuit thus tending to decrease its advantage over prior art clock circuits used with arrays of bipolar devices. Thus, the circuit of the invention will find its primary use with substantially pure capacitive loads such as are presented by arrays of IGFET devices of various kinds.

Figure 3:
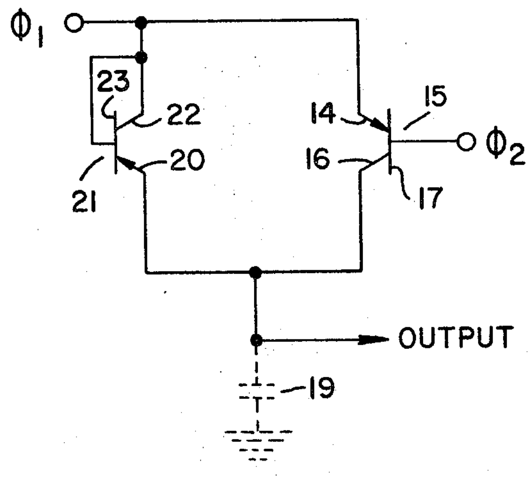
FIG. 3 is a schematic representation of a circuit according to another embodiment of this invention.

Referring to FIG. 3 a further embodiment of this invention is shown in which like circuit elements are given the same reference numeral as in FIG. 1. In FIG. 3 a bipolar triode 21 is substituted for the diode 11 of FIG. 1. The collector or output electrode 22 of triode 21 is electrically connected directly to the emitter or input electrode 14 of the triode 15. The emitter or input electrode 20 of triode 21 is electrically connected directly to the output or collector electrode 16 of the triode 15. The base or control electrode 23 of triode 21 is electrically connected directly to its collector or output electrode 22 and thus to the first clock input $\phi_1$. Thus, it will be seen that in the embodiment of FIG. 3 triodes 15 and 21 may be identical devices having a ratio of on-resistance that is 1:1. Yet the operation of the circuit shown in FIG. 3 will be identical to that shown in FIG. 1. Of course other bipolar devices could be substituted for diode 11 or triodes 15 and 21 in other circuits embodying this invention by connecting them into the circuit in such a way as to enable them to operate in the manner as described hereinabove. In addition, the polarity of the voltage could be reversed so as to provide positive pulses rather than negative pulses.

Figure 4:
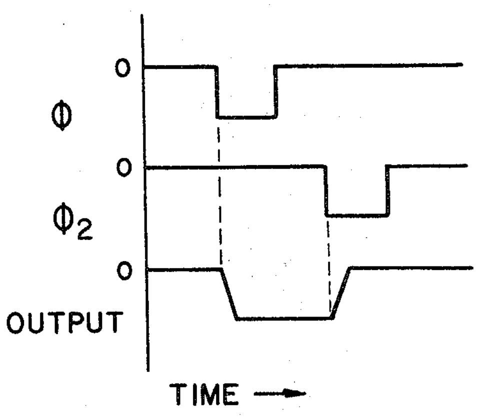
FIG. 4 is a timing diagram of another mode of operation of a circuit embodying this invention showing a different phase relationship between the input pulses and the output pulses thereof.

As shown in FIG. 4, circuits embodying this invention may be operated in such a way as to provide output pulses of longer duration than the clock pulses at either of the inputs $\phi_1$ or $\phi_2$. It will be understood that the capacitance 19 of the load is charged by the clock pulse at input $\phi_1$ through the diode 11 of FIG. 1 (or the triode 21 of FIG. 2). Such charge will remain on capacitance 19, to the extent that there is no resistive component in the load, until triode 15 is enabled by the appearance of the second clock pulse at input $\phi_2$. Thus, as shown in FIG. 4, a separation in time between the first clock pulse at input $\phi_1$ and the second clock pulse at input $\phi_2$ will produce an output pulse having a duration corresponding to such separation in time or phase relationship between such clock pulses. It will be understood that the clock pulses need not be as long as shown in FIGS. 2 and 4. They need only be long enough to allow for the charging of the capacitance 19 through the on-resistance of diode 11 or triode 21 in the case of the first clock pulse $\phi_1$ or to allow for the discharge of the capacitance 19 through the on-resistance of triode 15 in the case of the second clock pulse at input $\phi_2$. Thus, the duty cycle or on-time of diode 11 or triodes 15 and 21 may be very low and it is this aspect of the operation of a circuit in accordance with this invention which enables it to handle clock pulses of substantial energy content.

What I claim is:

1. A clock driver output stage for a capacitive load comprising:
   a. a first bipolar device having an input electrode and an output electrode;
   b. a second bipolar device having an input electrode; an output electrode and a control electrode;
   c. means electrically connecting said input electrode of said first bipolar device directly to said output electrode of said second bipolar transistor;
   d. means connecting said output electrode of said first bipolar device directly to said input electrode of said second bipolar device;
   e. means for supplying first clock pulses to said directly connected output electrode of said first bipolar device and input electrode of said second bipolar device;
   f. means supplying second clock pulses to said control electrode of said second bipolar device, and
   g. capacitive output means connected to said directly connected input electrode of said first bipolar device and said output electrode of said second bipolar device.

2. Apparatus of claim 1 wherein said first bipolar device is a transistor diode.

3. Apparatus of claim 1 wherein said first bipolar device is a transistor having its control electrode connected to its output electrode.

4. Apparatus as claimed in claim 1 wherein a portion of said second clock pulse occurs after said first clock pulse has ended.

5. Apparatus as claimed in claim 1 wherein said second clock pulse occurs at a predetermined time interval after said first clock pulse has ended.